United States Patent
Christie

(10) Patent No.: US 6,175,906 B1
(45) Date of Patent: *Jan. 16, 2001

(54) MECHANISM FOR FAST REVALIDATION OF VIRTUAL TAGS

(75) Inventor: David S. Christie, Austin, TX (US)

(73) Assignee: Advanced Micro Devices, Inc., Sunnyvale, CA (US)

(*) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/760,465

(22) Filed: Dec. 6, 1996

(51) Int. Cl.[7] ...................................... G06F 12/02
(52) U.S. Cl. .................. 711/207; 711/144; 711/156; 711/202; 711/203; 711/205
(58) Field of Search .................. 711/117, 204, 711/205, 206, 203, 208, 125, 144, 207, 201, 202; 707/201, 202, 205, 2; 395/846, 829

(56) References Cited

U.S. PATENT DOCUMENTS

| | | |
|---|---|---|
| 4,044,338 | 8/1977 | Wolf. |
| 4,453,212 | 6/1984 | Gaither et al.. |
| 4,680,700 * | 7/1987 | Hestler et al. ............ 364/200 |
| 4,807,115 | 2/1989 | Torng. |
| 4,858,105 | 8/1989 | Kuriyama et al.. |
| 4,928,223 | 5/1990 | Dao et al.. |
| 5,053,631 | 10/1991 | Perlman et al.. |
| 5,058,048 | 10/1991 | Gupta et al.. |
| 5,129,067 | 7/1992 | Johnson. |
| 5,136,697 | 8/1992 | Johnson. |

(List continued on next page.)

FOREIGN PATENT DOCUMENTS

| | | |
|---|---|---|
| 0259095 | 3/1988 | (EP). |
| 0381471 | 8/1990 | (EP). |
| 0459232 | 12/1991 | (EP). |
| 2263985 | 8/1993 | (GB). |
| 2263987 | 8/1993 | (GB). |
| 2281422 | 3/1995 | (GB). |

OTHER PUBLICATIONS

Hennesy, John. L., and Patterson, David A., *Computer Architecture A Quantitative Approach,* 1990 Morgan Kaufman Publishers Inc., pp. 437–445.

(List continued on next page.)

*Primary Examiner*—John W. Cabeca
*Assistant Examiner*—Christian P. Chace
(74) *Attorney, Agent, or Firm*—Conley, Rose & Tayon, PC; Lawrence J. Merkel

(57) ABSTRACT

A recovery mechanism to eliminate the need to re-fetch cache entries during virtual-to-physical memory re-mapping by reducing accesses and thus the demand on the table lookaside buffer (TLB) during the re-mapping recovery. Once one data block in a given page has been revalidated, the other blocks in the same page can be revalidated without accessing the TLB. If the virtual-to-physical mapping of one data block in a page has not changed, then the other data blocks within the same page also have not changed. Therefore, if a virtual tag was previously valid and a data block on the same page as the data block associated with the virtual tag has been revalidated, the virtual tag is valid and the virtual address can be validated. To identify which virtual tags are currently valid and which virtual tags were valid prior to the last re-mapping, a pair of valid registers is employed. A toggle circuit alternates between the valid registers. When a re-mapping occurs the current valid register becomes the previous valid register and the previous valid register is cleared and becomes the current valid register.

18 Claims, 2 Drawing Sheets

U.S. PATENT DOCUMENTS

| | | | |
|---|---|---|---|
| 5,226,126 | | 7/1993 | McFarland et al. . |
| 5,226,130 | | 7/1993 | Favor et al. . |
| 5,239,635 | * | 8/1993 | Stewart et al. ................. 395/400 |
| 5,349,651 | * | 9/1994 | Hetherington et al. ............ 395/400 |
| 5,428,757 | * | 6/1995 | Sutton ........................... 711/203 |
| 5,481,689 | * | 1/1996 | Stamm et al. ................... 395/412 |
| 5,623,619 | | 4/1997 | Witt . |
| 5,630,088 | * | 5/1997 | Gupta et al. .................... 395/417 |
| 5,651,125 | | 7/1997 | Witt, et al. . |
| 5,664,139 | * | 9/1997 | Spurlock ......................... 711/203 |
| 5,712,998 | | 1/1998 | Rosen . |
| 5,721,858 | * | 2/1998 | White et al. .................... 395/413 |
| 5,764,938 | | 6/1998 | White et al. . |
| 5,900,022 | * | 5/1999 | Kranich ........................... 711/205 |
| 5,923,864 | * | 7/1999 | Inoue ............................. 395/400 |
| 5,956,756 | * | 9/1999 | Khalidi ........................... 711/202 |
| 5,963,984 | * | 10/1999 | Garibay, Jr. et al. ............ 711/206 |

OTHER PUBLICATIONS

Intel, "Chapter 2: Microprocessor Architecture Overview," pp. 2–1 through 2–4.

Michael Slater, "AMD's K5 Designed to Outrun Pentium," Microprocessor Report, vol. 8, No. 14, Oct. 24, 1994, 7 pages.

Sebastian Rupley and John Clyman, "P6: The Next Step?," PC Magazine, Sep. 12, 1995, 16 pages.

Tom R. Halfhill, "AMD K6 Takes On Intel P6," BYTE, Jan. 1996, 4 pages.

Holstad, S. Tutorial Tuesday: Decoding MMX [on line] copyright 1997 [retrived 1997–01–14] pp. 1–5, Earthlink Network, Inc. [retrived from the internet:<htt://www.earth-link.net/daily/Tuesday/MMX]>.*

Intel MMX (TM) Technology –Frequently Asked Questions [online] copyright 1997 [retrieved 1997–14–15]pp. 1–6, Intel Corporation [retrieved from internet:<http://www.intel.com/drg/mmx/support/fag.htm>].*

"*Intel Architecture Software Developer's Manual, vol. 1: Basic Architecture,* "Intel Corp., Prospect ILm 1996, 1997 Chapter 8: Programming With the Intel MMX™ Technology, pp. 8–1 through 8–15.

* cited by examiner

MECHANISM FOR FAST REVALIDATION OF VIRTUAL TAGS

BACKGROUND OF THE INVENTION

1. Field of the Invention

This invention relates to caches in microprocessor systems and, more particularly, to the revalidation of virtual tags after memory mapping changes.

2. Description of the Relevant Art

Microprocessors utilize caches to provide faster access to data stored in memory. Caches are typically smaller and faster memory devices that store the most recently accessed blocks of data. Because memory accesses are typically made to memory locations in close proximity to previously accessed memory locations, storing the most recently accessed blocks of data significantly reduces the number of accesses to the system memory.

Virtual addresses in a microprocessor must be translated to physical addresses prior to memory accesses. Likewise, caches that reference data blocks using physical addresses must convert virtual addresses to physical addresses before detecting a cache hit. Rather than translating a virtual address each time it is accessed, a translation lookaside buffer (TLB) stores the most recently accessed virtual-to-physical address translations.

The use of virtual address tags in a cache provides faster and simpler access to data blocks stored in cache. Virtual tags eliminate the need to perform a TLB look-up prior to detecting a cache hit. Although a TLB look-up can be done in parallel with cache access, increasing the number of TLB look-ups requires a larger TLB to minimize TLB misses. It is advantageous to keep the TLB small enough to avoid impacting the memory access time. Large TLB's in aggressive clock rate processors typically force a hierarchical TLB structure that adds further complications. The use of virtual tags in a cache greatly reduces the demand on the TLB because the TLB only needs to be referenced on cache misses. In virtual tag caches, the demand for the TLB may be sufficiently low to allow one TLB to services two caches, e.g., an instruction cache and a data cache.

The main drawback of using virtual tags in a cache is that the tags must be invalidated whenever a virtual-to-physical memory mapping change occurs. Although mapping changes typically involve little if any of the data stored in the cache, the tags must be invalidated. The chance exists that one or more virtual tags are remapped to a different physical location. An access to a virtual tag that has been remapped would yield the wrong data.

Invalidating the virtual tags of a cache effectively empties the cache. All data blocks must be re-fetched from memory according to the new mapping, even though many cache entries still have valid virtual tags. Therefore, many of the existing blocks in cache are re-fetched and re-loaded into the cache.

Processors which support write-back caching and maintain coherency with physical memory must typically store physical tags for each cache entry. The physical tags are required for snooping and provide the proper memory address on a write-back. Each physical tag is associated with a cache entry and a virtual tag.

The presence of the physical tags can be used to avoid the unnecessary re-loading of the cache when a memory mapping change occurs. When a cache miss occurs due to an invalidated virtual tag, the TLB is referenced to translate the virtual address of the requested data to a physical address. The physical address from the TLB is checked against the physical tag associated with the invalidated virtual tag. If the physical tag matches the physical address from the TLB, the virtual tag is still valid and the requested data block resides in cache. Because the data block is already in cache, there is no need to refetch the data from memory. The data is read from cache and the virtual tag is revalidated by asserting a valid bit of the virtual tag. This recovery mechanism reduces cache misses and system memory accesses.

The above described recovery mechanism causes a flurry of TLB accesses when a virtual-to-physical memory mapping change occurs (i.e. a remapping occurs). A remapping invalidates all the virtual tags, which effectively empties the cache. Because the TLB is accessed on each cache miss, a remapping causes a short term high demand on the TLB accesses. During these periods of high demand on the TLB, the TLB can create a bottleneck that slows down the recovery from the remapping. What is desired is a way to reduce the number of TLB accesses during a virtual-to-physical memory mapping recovery.

SUMMARY OF THE INVENTION

The problems outlined above are in large part solved by a mechanism that revalidates virtual tags of data blocks on the same page as recovered data blocks. Once a virtual-to-physical mapping of one data block in a given page has been revalidated, other blocks in the same page can be recovered without referring to the TLB. Typically, most of the cache contents are not affected by the remapping that caused the invalidation of the virtual tags. Therefore, most of the virtual tags are still valid. Once one virtual tag is revalidated by converting the virtual address to a physical address and comparing the physical address to the physical tag, it is concluded that the corresponding page has not been remapped. Therefore, all other virtual tags that are associated with data blocks on the same page have also not been remapped. After the virtual tag of one block of data within a page of data has been revalidated, other blocks of data on that page can be revalidated without accessing the TLB.

A register records the page numbers of data blocks that have been successfully recovered, i.e. the associated virtual tag has been revalidated. The register is referenced in parallel with the cache look-up. If the page number of the requested address matches an entry in this register, and a previously valid virtual tag matches the requested virtual address, then the virtual tag is still valid and can be revalidated immediately.

Broadly speaking, the present invention contemplates a cache control circuit including a virtual tag register for storing virtual tags, a physical tag register for storing physical tags, a valid register, a recovery register, and a valid circuit. Each virtual tag is associated with a data block in a cache. Each physical tag is associated with a data block in a cache. The valid register includes a plurality of registers for storing current valid bits and previous valid bits, wherein the current valid bits indicate that an associated virtual tag is currently valid, and the previous valid bits indicate that an associated virtual tag was valid during a previous cycle. The recovery register stores a page number of a recovered data block. The valid circuit asserts a current valid bit associated with a virtual tag if a page number of a data block associated with the virtual tag matches the page number stored in the recovery register, and a previous valid bit associated with the virtual tag indicates the virtual tag was valid during a previous cycle.

The present invention still further contemplates a method for validating a virtual tag including the steps of: storing a page number of a recovered data block, storing a previous valid bit indicative of the validity of a virtual tag in a previous validation cycle, and validating the virtual tag if the previous bit indicates the virtual tag was valid in a previous cycle, and a page number of a data block associated with the virtual tag matches the stored page number.

BRIEF DESCRIPTION OF THE DRAWINGS

Other objects and advantages of the invention will become apparent upon reading the following detailed description and upon reference to the accompanying drawings in which.

Figure 1:
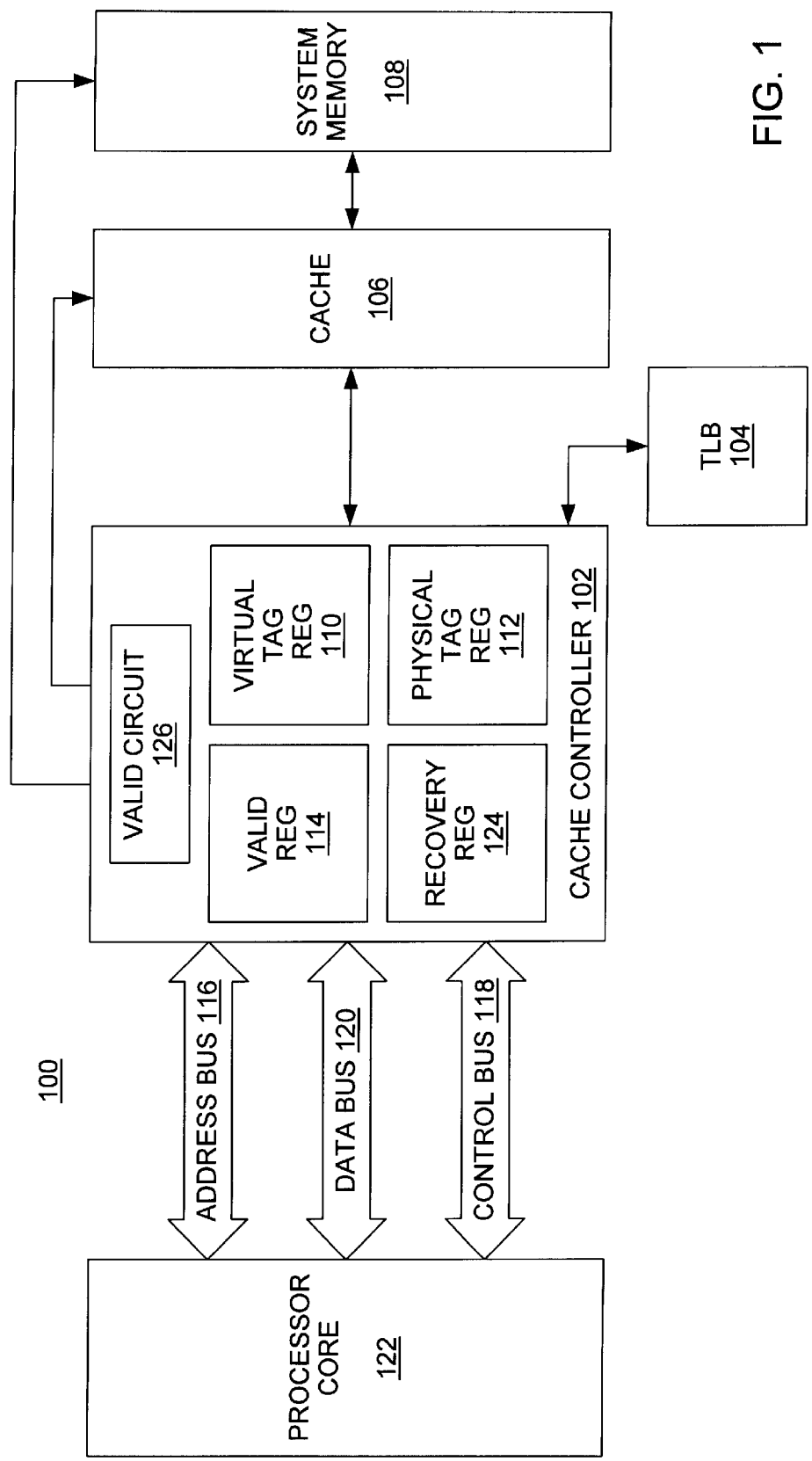
FIG. 1 is a block diagram of a cache system for fast revalidation of virtual tags after a virtual-to-physical memory mapping change.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Referring now to the drawings, FIG. 1 is a block diagram of a cache system for fast revalidation of virtual tags after a virtual-to-physical mapping change. Cache system 100 includes a cache controller 102, a translation lookaside buffer (TLB) 104, a cache 106, a system memory 108, an address bus 116, a control bus 118, a data bus 120, and a processor core 122. Cache 106 includes a storage array including a plurality of entries. A data block is stored in each entry. Each entry has a virtual tag that represents the virtual address of the data block stored in that entry. Each entry also has a physical tag that represents the physical address of the data block stored in that entry. Therefore, each data block in cache 106 has a virtual tag and a physical tag associated with that data block.

Cache controller 102 includes a virtual tag register 110, a physical tag register 112, a valid register 114, a recovery page register 124, and a valid circuit 126. Cache controller 102 controls storage of information within cache 106 and controls the transfer of data between cache 106, system memory 108, and processor core 122. When data or instructions are fetched, cache controller 102 first determines if the requested data resides in cache 106. If the requested data is in cache 106 (i.e., a cache hit), the data is transferred from cache 106 to processor core 122 by cache controller 102. If, however, the data is not in cache 106 (i.e. a cache miss), the data is fetched from system memory 108 and stored in cache 106. The requested data is then transferred from cache 106 to processor core 122.

Virtual tag register 110 stores the virtual tags of the entries in cache 106. Each virtual tag is associated with one data block in cache and represents the virtual address of that data block. Physical tag register 112 stores the physical tags of the entries in cache 106. Each physical tag is associated with one data block in cache and represents the physical address of that data block. The virtual tag of a data block is the translation of the physical tag of that data block. Valid register 114 stores valid bits indicating the validity of the virtual tags in virtual tag register 110, i.e. whether the virtual tag is a valid translation of the physical tag. When a virtual-to-physical memory mapping change occurs, the virtual tags in virtual tag register 110 are invalidated. Invalid virtual tags are indicated by deasserting a valid bit in valid register 114 associated with that virtual tag. When a virtual tag is revalidated, the valid bit in valid register 114 associated with that virtual tag is asserted. Valid circuit 126 controls the invalidation and validation of virtual tags.

TLB 104 stores virtual-to-physical translation entries of a page table located in system memory 108. TLB 104 eliminates the need to generate physical addresses from virtual addresses each time a virtual address is accessed, and stores the translations for the most recently accessed virtual addresses.

Generally speaking, during operation when cache controller 102 receives a request to fetch instructions or data from system memory 108 or cache 106, the virtual address received on address bus 116 is compared to the virtual tags of the data blocks stored in cache 106. If a hit is detected (i.e. a virtual address matches a valid virtual tag), the requested data resides in cache 106 and there is no need to translate the virtual address to a physical address. If the virtual address is a miss (i.e. the virtual address does not match a valid virtual tag), a TLB 104 look-up is performed to determine the physical address of the data, and the physical address is used to fetch the data from system memory 108 to cache 106.

When data is written from processor core 122 to system memory 108, the virtual address received by cache controller 102 on address bus 116 is compared to the virtual tags in virtual tag register 110. If a hit occurs, the data is written to the appropriate data block in cache 106. If the system supports write-back caching, the physical tag is used to provide the address to update system memory 108. If a cache miss occurs, TLB 104 looks-up the corresponding physical address, which cache controller 102 uses to write to system memory 108.

When a virtual-to-physical address mapping change occurs, the physical tags in physical tag register 112 are still valid. The virtual tags in virtual tag register 110, however, may not be valid. If the remapping changed the mapping of a data block in cache 106, the virtual tag associated with data block is invalid. In other words, the virtual tag of that block is no longer a valid translation of the physical tag of that block. Because it is not known which, if any, data blocks in cache 106 are effected by a remapping, all virtual tags are invalidated. The virtual tags are invalidated by deasserting the valid bits in valid register 114.

In one embodiment, if a cache miss occurs due to an invalidated virtual tag, valid circuit 126 uses a recovery mechanism to determine if the invalidated tag was affected by the remapping. The virtual address of the requested data is translated to a physical address by TLB 104. The physical address is compared to the physical tag in physical tag register 112 associated with the invalidated virtual tag. If the physical address received from TLB 104 matches the physical tag associated with the invalidated virtual tag, then the remapping did not effect that data block and the matched virtual tag is still valid. The matched virtual tag is revalidated by asserting the valid bit in valid bit register 114. The above described recovery mechanism eliminates the need for re-fetching data blocks that reside in cache and are not affected by the remapping.

In one embodiment, valid circuit 126 uses a mechanism to speed the recovery from virtual-to-physical memory mapping changes that eliminates the need for a TLB look-up each time a tag is revalidated. Once the virtual-to-physical mapping of one block in a given page has been revalidated, it is concluded that the mappings of other blocks on that page are also valid. In other words, if one block on a page is not affected by a remapping, then all the blocks on that page are not affected by the remapping.

Recovery page register 124 stores the page numbers of recovered data blocks, i.e. data blocks with revalidated virtual tags. When data is requested, recovery page register 124 is referenced in parallel with a cache look-up. If a virtual tag, which was previously valid, matches the virtual address of the requested data and the page number of the requested data matches an entry in recovery page register 124, then the requested data is on the same page as a previously recovered data block. The requested data resides in cache 106 and the matched virtual tag is valid. The virtual tag is revalidated by simply asserting the valid bit in valid register 114 for that tag.

It is important to note that the virtual tag must have been valid during the preceding validation cycle to implement the above described fast recovery mechanism. A validation cycle is defined as the time period from one remapping to the next remapping. Otherwise, invalid matches can occur. For example, assume the following three conditions: a remapping occurs that invalidates the mapping of a first virtual tag; a new data block with a second virtual tag, on the same virtual page as the first virtual tag, is stored in the cache; and a second remapping occurs that does not affect the mapping of the second virtual tag. If a data block associated with the second virtual tag is accessed, the second virtual tag will be revalidated by translating the virtual tag to a physical address and comparing the physical address to the physical tag. The page address of the second virtual tag, which is the same as the page address of the first virtual tag, will be stored in recovery page register 124. If the first virtual tag is subsequently accessed, it will appear to be a valid tag because it is on the same page as the second virtual tag. The first virtual tag, however, was invalidated by the first remapping. To prevent this potential problem, only virtual tags that are known to be valid in the preceding validation cycle are revalidated using the above described fast recovery mechanism. If a virtual tag was valid in the preceding cycle and the remapping did not affect another tag on the same page, the virtual tag is still valid.

The following example illustrates the above described potential problem with revalidating a virtual tag that was not valid in the preceding validation cycle. Consider a situation in which a virtual page A is mapped to a physical page A. A first remapping occurs that remaps virtual page A to physical page B. Virtual tags VT1 and VT2 both contain addresses within virtual page A. A new data block, from physical page B, with a virtual tag VT2 is loaded into cache 106. At this point, VT2 is a valid tag because it is associated with a data block from physical tag B. VT1, however, is an invalid tag because it is still associated with a data block from physical page A. A second remapping then occurs that does not affect the mapping of VT1 and VT2. If data from VT2 is requested, the physical address of the data block associated with VT2 will be used to revalidate VT2. The address of virtual page A will then be stored in recovery page register 124. If data is requested using VT1, VT1 will appear valid because it contains an address within virtual page A, which is stored in recovery page register 124. VT1, however, is still associated with the data block from physical page A, i.e., the wrong data block. To prevent these invalid matches, only virtual tags that were valid during the preceding validation cycle are validated using the above described fast recovery mechanism. In the above example, VT1 was invalidated after the first remapping. Therefore, it should not be revalidated after the second remapping. A mechanism for identifying virtual tags that are valid during the preceding validation cycle is provided. This assures that a validity indication does not survive two remappings.

Figure 2:
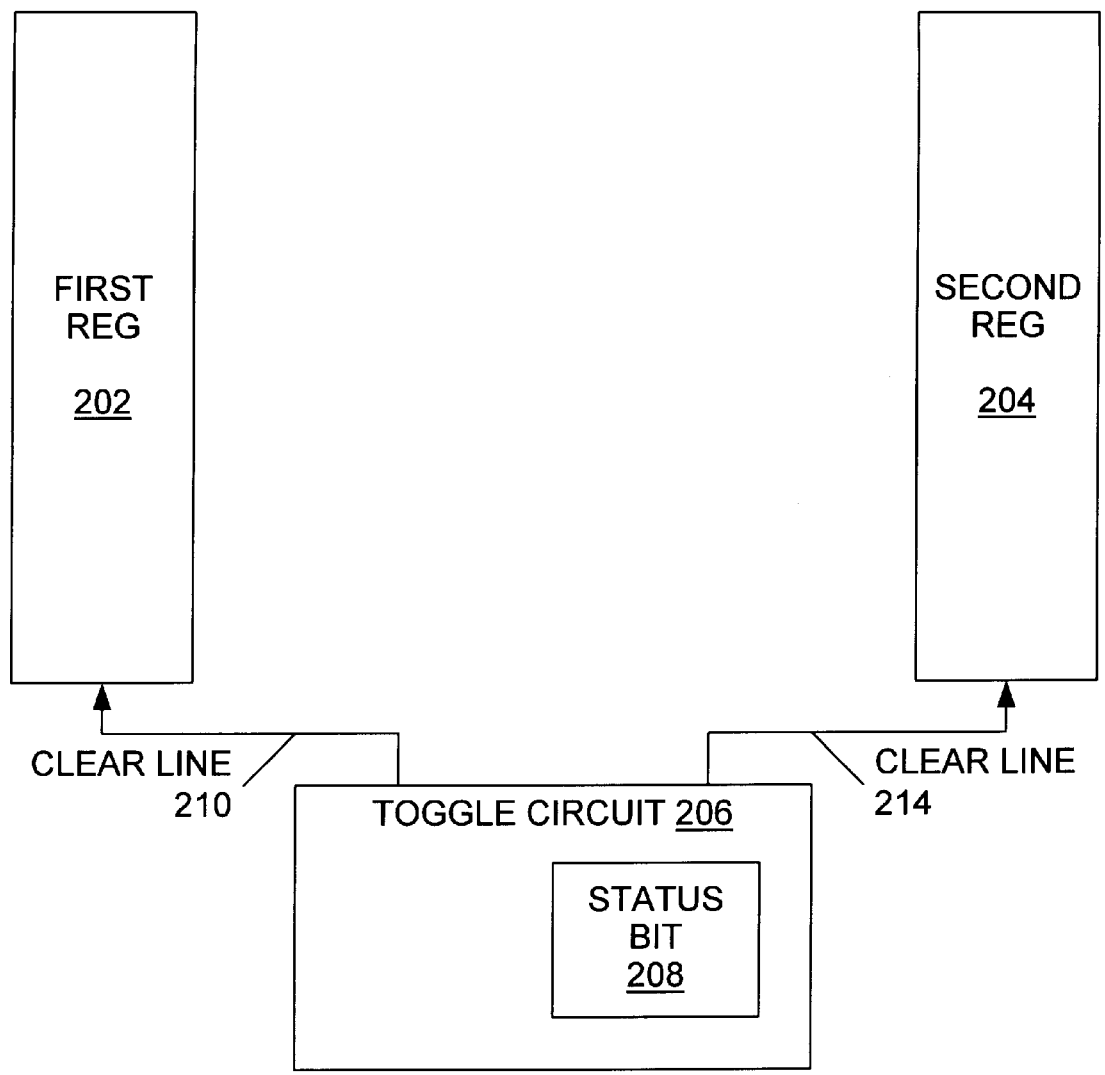
FIG. 2 is a block diagram of a valid register of FIG. 1.

Referring now to FIG. 2, a block diagram of one embodiment of valid register 114 is shown. Valid register 114 identifies valid virtual tags and previously valid virtual tags. Valid register 114 includes a first register 202, a second register 204, a toggle circuit 206, a clear line 210, and a clear line 214. Toggle circuit 206 includes a status bit 208. First register 202 includes a valid bit for each entry in cache 106. Second register 204 also includes a valid bit foe each entry in cache 106. Toggle circuit 206 alternately selects first register 202 or second register 204 as the current valid register for the virtual tags in virtual tag register 110. The other register indicates previously valid virtual tags in virtual tag register 110. In other words, one register indicates currently valid tags, while the other register indicates tags that were valid in the last validation cycle, i.e. prior to the last virtual-to-physical remapping. Toggle circuit 206 alternates between first register 202 and second register 204 when a remapping occurs. When a remapping occurs, the current valid register becomes the previous valid register, and the previous register becomes the current valid register. Clear line 210 or clear line 214 clear the previous valid register when it is switched from previous valid register to current valid register. Status bit 208 indicates which register is the current valid register.

For example, assume first register 202 is the current valid register and second register 204 is the previous valid register. When a remapping occurs, toggle circuit 206 changes first register 202 to the previous valid register. At the same time, second register 204 is cleared and becomes the current valid register. The current valid register is cleared because after a remapping all virtual tags are invalid. The previous valid register indicates which tags were valid in the preceding validation cycle. Because the valid bits are cleared, or deasserted, every other cycle, a valid bit will not survive two validation cycles.

It is apparent that the described mechanism for fast revalidation of virtual tags can be used with either an instruction cache or a data cache. It is further apparent that recovery page register 124 may have a variable number of entries. In a preferred embodiment, a one entry recovery page register 124 is used in an instruction cache. In a preferred embodiment, the above revalidation mechanism is not used in a data cache. This is an effective implementation because data references have less locality and instruction fetch penalties tend to be more visible than data fetch penalties in an out-of-order execution processor.

In one embodiment, the cache controller speculatively revalidates blocks during idle cycles. In this manner, the cache controller revalidates valid virtual tags prior to an access to a data block associated with that virtual tag. If the data block associated with the revalidated virtual tag is later accessed, the data block can be immediately fetched from the cache. Additionally, more virtual tags are revalidated prior to a remapping. Therefore, more previous valid bits are asserted, which allows more virtual tags to be revalidated using the fast recovery mechanism disclosed above.

Numerous variations and modifications will become apparent to those skilled in the art once the above disclosure is fully appreciated. It is intended that the following claims be interpreted to embrace all such variations and modifications.

What is claimed is:

1. An apparatus comprising:
   a translation lookaside buffer (TLB) configured to store virtual to physical address translations;
   a cache having a plurality of entries, each entry capable of storing a data block; and
   a cache controller coupled to said translation lookaside buffer and said cache, wherein said cache controller is further coupled to receive a virtual request address, said cache controller including:
      a virtual tag storage configured to store virtual tags, wherein each virtual tag is associated with one of said plurality of entries in said cache, and wherein said virtual tag represents a virtual address of said data block stored in said one of said plurality of entries;
      a physical tag storage configured to store physical tags, wherein each physical tag is associated with one of said plurality of entries in said cache, and wherein said physical tag represents a physical address of said data block stored in said one of said plurality of entries;
      a valid storage configured to store current valid bits and previous valid bits, wherein each of said current valid bits indicates that an associated virtual tag in said virtual tag storage is currently valid, and wherein each of said previous valid bits indicates that an associated virtual tag was valid during a previous validation cycle, and wherein a hit is detected in said cache and said data block associated with said a first virtual tag in said virtual tag storage and stored in said cache is used to satisfy a request if said first virtual tag matches said virtual request address and a first current valid bit corresponding to said first virtual tag is set, and wherein each of said current valid bits is reset at a start of a current validation cycle, and wherein a start of said current validation cycle corresponds to a remapping of one or more virtual pages to one or more physical pages;
      a recovery register configured to store a virtual page number of a recovered data block, wherein a virtual address corresponding to said recovered data block has been translated in said TLB during said current validation cycle; and
      a valid circuit coupled to said virtual tag storage, said physical tag storage, said valid storage and said recovery register, wherein said valid circuit is configured to assert a second current valid bit associated with a second virtual tag in said virtual tag storage and to inhibit access to said TLB to verify a virtual to physical address translation corresponding to said second virtual tag in response to: (i) access of a data block associated with said second virtual tag in said cache during said current validation cycle, (ii) a page number of said second virtual tag matching said virtual page number stored in said recovery register, and (iii) a second previous valid bit associated with said second virtual tag indicating said virtual tag was valid during said previous validation cycle.

2. The apparatus as recited in claim 1 wherein each of said previous valid bits indicates whether or not an associated virtual tag was valid during a preceding validation cycle.

3. The apparatus as recited in claim 2 wherein said valid storage further includes a toggle circuit coupled to a first storage and a second storage, wherein said toggle circuit is configured to select either said first storage or said second storage to store said current valid bits, and wherein said toggle circuit is further configured to change a selection of said first storage or said second storage in response to a start of a new validation cycle, whereby a storage storing current valid bits becomes a storage storing previous valid bits and a storage storing previous valid bits becomes a storage storing current valid bits, and wherein said toggle circuit is further configured to clear said first storage or said second storage that stores said current valid bits in response to said start of said new validation cycle.

4. The apparatus as recited in claim 1 wherein said valid circuit is configured to recover a data block by matching said virtual request address to a virtual tag stored in said virtual tag storage but said current valid bit corresponding to said virtual tag is invalid, accessing said TLB to translate said virtual request address to a physical request address, comparing the physical request address to a physical tag stored in said physical tag storage and associated with said virtual tag, and setting a current valid bit corresponding to said virtual tag if said physical request address matches said physical tag.

5. The apparatus as recited in claim 4 wherein said valid circuit is configured to attempt to validate a virtual tag that matches said virtual request address if a current valid bit of said virtual tag is deasserted and a previous valid bit of said virtual tag is asserted.

6. The apparatus as recited in claim 1 wherein said requested data block is accessed directly from said cache if said virtual tag is validated.

7. The apparatus as recited in claim 1 wherein said recovery register stores a plurality of page numbers of recovered data blocks.

8. A computer system comprising:
   a processor core;
   a translation lookaside buffer (TLB) configured to store virtual to physical address translations;
   a cache having a plurality of entries, each entry capable of storing a data block; and
   a cache controller coupled to said translation lookaside buffer and said cache, wherein said cache controller is further coupled to receive a virtual request address, said cache controller including:
      a virtual tag storage configured to store virtual tags, wherein each virtual tag is associated with one of said plurality of entries in said cache, and wherein said virtual tag represents a virtual address of said data block stored in said one of said plurality of entries;
      a physical tag storage configured to store physical tags, wherein each physical tag is associated with one of said plurality of entries in said cache, and wherein said physical tag represents a physical address of said data block stored in said one of said plurality of entries;
      a valid storage configured to store current valid bits and previous valid bits, wherein each of said current valid bits indicates that an associated virtual tag in said virtual tag storage is currently valid, and wherein each of said previous valid bits indicates that an associated virtual tag was valid during a previous validation cycle, and wherein a hit is detected in said cache and said data block associated with said a first virtual tag in said virtual tag storage and stored in said cache is used to satisfy a request if said first virtual tag matches said virtual request address and a first current valid bit corresponding to said first virtual tag is set, and wherein each of said current valid bits is reset at a start of a current validation cycle, and wherein a start of said current validation cycle corresponds to a remapping of one or more virtual pages to one or more physical pages;

a recovery register configured to store a virtual page number of a recovered data block, wherein a virtual address corresponding to said recovered data block has been translated in said TLB during said current validation cycle; and a valid circuit coupled to said virtual tag storage, said physical tag storage, said valid storage and said recovery register, wherein said valid circuit is configured to assert a second current valid bit associated with a second virtual tag in said virtual tag storage and to inhibit access to said TLB to verify a virtual to physical address translation corresponding to said second virtual tag in response to: (i) access of a data block associated with said second virtual tag in said cache during said current validation cycle, (ii) a page number of said second virtual tag matching said virtual page number stored in said recovery register, and (iii) a second previous valid bit associated with said second virtual tag indicating said virtual tag was valid during said previous validation cycle.

9. The computer system as recited in claim 8 wherein each of said previous valid bits indicates whether or not an associated virtual tag was valid during a preceding validation cycle.

10. The computer system as recited in claim 9 wherein said valid storage further includes a toggle circuit coupled to a first storage and a second storage, wherein said toggle circuit is configured to selects either said first storage or said second storage to store said current valid bits, and wherein said toggle circuit is further configured to change a selection of said first storage or said second storage in response to a start of a new validation cycle, whereby a storage storing current valid bits becomes a storage storing previous valid bits and a storage storing previous valid bits becomes a storage storing current valid bits, and wherein said toggle circuit is further configured to clear said first storage or said second storage that stores said current valid bits in response to said start of said new validation cycle.

11. The computer system as recited in claim 8 wherein said valid circuit is configured to recover a data block by matching said virtual request address to a virtual tag stored in said virtual tag storage but said current valid bit corresponding to said virtual tag is invalid, accessing said TLB to translate said virtual request address to a physical request address, comparing the physical request address to a physical tag stored in said physical tag storage and associated with said virtual tag, and setting a current valid bit corresponding to said virtual tag if said physical request address matches said physical tag.

12. The computer system as recited in claim 11 wherein said valid circuit is configured to attempt to validate a virtual tag that matches said virtual request address if a current valid bit of said virtual tag is deasserted and a previous valid bit of said virtual tag is asserted.

13. The computer system as recited in claim 8 wherein said requested data block is accessed directly from said cache if said virtual tag is validated.

14. The computer system as recited in claim 8 wherein said recovery register stores a plurality of page numbers of recovered data blocks.

15. A method for validating a virtual tag in a cache, comprising:

accessing said cache with a virtual address, said cache including a plurality of entries, each of said plurality of entries capable of storing a data block;

detecting a hit in said cache if said virtual address matches a virtual tag in said cache and a current valid bit indicates that said virtual tag is valid, wherein a data block in one of said plurality of entries associated with said virtual tag is used in response to said detecting said hit, said virtual tag representing a virtual address of said data block in said one of said plurality of entries;

storing a virtual page number of a recovered data block, wherein said recovered data block corresponds to a second virtual tag for which a virtual-to-physical translation has been performed in a translation lookaside buffer (TLB) subsequent to a remapping of one or more virtual pages to one or more physical pages, and wherein a validation cycle is initiated upon said remapping;

storing a previous valid bit indicative of the validity of said virtual tag in a previous validation cycle;

validating said virtual tag if said previous valid bit indicates said virtual tag was valid in a previous validation cycle and a page number of said virtual tag matches said virtual page number of said recovered block, said validating including inhibiting access to said TLB for a virtual to physical translation corresponding to said virtual tag;

accessing said cache with a second virtual address subsequent to said validating; and detecting a hit for said second virtual address responsive to said validating.

16. The method as recited in claim 15 wherein said validating said virtual tag further comprises asserting a current valid bit of said virtual tag.

17. The method as recited in claim 16 further comprising:

matching a virtual address of a requested data block to said virtual tag; and attempting to validate said virtual tag if said current valid bit of said virtual tag is deasserted and said previous valid bit of said virtual tag is asserted.

18. The method as recited in claim 15 further comprising:

matching a second virtual address to a virtual tag stored in a virtual tag storage;

translating said second virtual address to a second physical address using said TLB;

comparing said second physical address to a physical tag associated with said virtual tag to determine if said second physical address matches said physical tag; and validating said virtual tag if said second physical address matches said physical tag associated with said virtual tag.

* * * * *